United States Patent Office

3,304,160
Patented Feb. 14, 1967

3,304,160
DEHYDROFLUORINATION OF INORGANIC
COMPOUNDS
James J. Harris, Pittsburgh, Pa., assignor to Koppers
Company, Inc., a corporation of Delaware
No Drawing. Filed June 25, 1963, Ser. No. 290,307
7 Claims. (Cl. 23—367)

This invention relates to a broad general method of dehydrofluorinating compounds containing reactive hydrogen and reactive fluorine atoms. In one specific aspect, it relates to a method of making organometallic compounds containing metallic or metalloid bonds by intermolecular and intramolecular condensation.

Compounds which may be prepared according to the present invention have numerous industrial uses. For example, B-fluoroborazines and various substituted borazines derived therefrom have been found to be useful as fuel additives, hydraulic fluids, and in the preparation of optical bleaches and anti-oxidants, as described in my Patent U.S. 3,052,686.

Heretofore the preparation of organometallic and metalloid compounds, using a metallic or metalloid fluoride as a starting material, were very difficult because of the relative stability and corresponding inactivity of metalloidfluorine bond towards the usual reactions used to form metalloid compounds. For example, it was not possible to prepare directly, by condensation under mild conditions, B-fluoroborazines from boron trifluoride, P-fluorophosphazanes from phosphorus pentafluoride, and Si-fluorosilazanes from silicon tetrafluoride. In order to prepare fluoride-containing borazines, phosphazanes, and silazanes, it was necessary to use a roundabout method of first preparing the corresponding chloride, bromide, or iodide, and then subjecting the product to a fluorine exchange reaction. Unfortunately, the method is of limited scope, as typified by the high temperature requirements for the formation of B-chloroborazine and the high reactivity of boron-chlorine bond, making the preparation of borazines containing other than inert hydrocarbon type constituents impossible. Thus, derivatives of alcohols, carboxylic acid esters or ethers substituted on the borazine ring would be difficult or impossible to prepare because of the competing reaction of these substituents with boron trichloride.

The compounds prepared according to the present invention, normally range from liquids to semi-solids and solid. They are useful as components of flame-resisting compositions; as plasticizers; as fuel additives; as the active ingredient in insecticides, bactericides, germicides, fungicides, pesticides, and the like; and as chemical intermediates in the preparation of other compounds. Other uses include as thermally stable polymers or as polymer additives to impart neutron absorbing properties to the polymer to which it is added and to improve the thermal stability of the polymer; as rocket fuels or as components of such fuels; as heat exchange media or as modifiers for such media whereby they can be used at higher temperatures; as petroleum additives which are hydrolytically stable (e.g. viscosity index improvers, lubricants and greases for high temperature application, cetane improvers, ignition promotors, anti-knock agents, preventatives of preignition, etc.); and in making new types of dyes and pigments. Some of the products, for instance those containing reactive hydrogen or polymerizable groups, are also useful as crosslinking agents in resinous compositions.

It is, therefore, an object of the present invention to form compounds having metalloid to metalloid bonds by dehydrofluorination condensation.

It is another object of the present invention to prepare fluorine containing heterocyclic metalloid compounds.

In accordance with the invention, I have discovered a method of simultaneously making salts of fluorinated protonic acids and condensation products characterized by at least one Y—Z bond, wherein Y is a member selected from the group consisting of boron, silicon, tin, nitrogen, phosphorus, arsenic, antimony, bismuth, and sulfur and Z is a member selected from the group consisting of boron, silicon, titanium, zirconium, tin, phosphorus, arsenic, antimony, and sulfur. This method comprises reacting under substantially anhydrous conditions and at a temperature of −20 to 250° C.

(a) A Lewis acid of the formula:

$$MF_m$$

wherein M is a member selected from the group consisting of zinc, boron, silicon, titanium, zirconium, germanium, tin, phosphorus, arsenic, antimony, and molybdenum; and $m$ is an integer equal to the valence of M, and (b) An organic Lewis base of the formula:

$$R_3Q$$

wherein Q is a member selected from the group consisting of nitrogen and phosphorus; each R taken individually is independently selected from the group consisting of hydrogen, alkyl having 1–18 carbon atoms, alkenyl having 2–18 carbon atoms, cycloalkyl having 3–7 annular carbon atoms, phenyl, halophenyl, and lower alkoxyphenyl; and R and at least one more R, taken collectively with Q, form a heterocyclic ring system containing up to 18 carbon atoms and not more than two rings each having 4 to 6 annular carbon atoms with (c) A reactive hydrogen-containing compound of the formula:

$$R'_{y-1}YH$$

wherein Y is defined as above; $y$ is an integer equal to the valence of Y; each R' taken individually is independently selected from the group consisting of alkyl having 1–18 carbon atoms, alkenyl having 2–18 carbon atoms, cycloalkyl having 3–7 annular carbon atoms, aryl having 6–12 carbon atoms, phenyl lower alkyl, phenylamino, dialkylaminophenyl, carbalkoxyphenyl, phenylazophenyl, and hydrogen; and when $y$ is equal to at least 3, R' and at least a second R' taken collectively with Y form a heterocyclic ring system containing up to 18 carbon atoms and not more than two rings each having 4 to 6 annular carbon atoms, and (d) A fluorine-containing compound of the formula:

$$R''_{z-1}ZF$$

wherein Z is as defined above; and $z$ is an integer equal to the valence of Z; each R'' taken individually is independently selected from the group consisting of alkyl having 1–18 carbon atoms, alkenyl having 2–18 carbon atoms, cycloalkyl having 3–7 annular carbon atoms, phenyl, nitrophenyl, halophenyl, lower alkylphenyl, phenylazophenyl, lower alkoxyphenyl, and fluorine; and when z is equal to at least 3, R″ and a second R″ taken collectively with Z form a heterocyclic ring containing 3 to 5 annular carbon atoms. Thereafter the salts of the fluorinated protonic acids and the condensation products are recovered from the reaction mixture.

In order to understand my invention, certain theoretical considerations and definitions are necessary. The definitions of an acid and a base, according to Bronsted, are that an acid is any substance which can donate a proton to another substance; i.e. a proton donor, such as HCl; and a base is any substance which can accept a proton from any other substance; i.e. a proton acceptor, such as NaOH. A fluorinated protonic acid, as herein defined, means a Bronsted acid containing at least one hydrogen and one fluorine attached to the M atom of $MF_m$, such as $HBF_4$. By the Lewis concept of acids and bases, an acid is any species which can accept an electron pair; i.e. an electron pair acceptor, such as $BF_3$; and a base is any species which can donate an unshared electron pair to an electron pair acceptor; i.e. an electron pair donor, such as $(CH_3)_3N$. Thus, a Lewis acid-Lewis base reaction is a sharing of an electron pair with a Lewis acid by a Lewis base, which results in the formation of a coordinate-covalent bond, sometimes written $$(CH_3)_3N \rightarrow BF_3$$

between the acid and the base. The product obtained is designated as an adduct. Organic Lewis bases are compounds characterized as Lewis bases in which at least one organic radical is attached to the central atom having an unshared pair of electrons.

Salts of fluorinated protonic acids, as herein defined, mean the reaction products of fluorinated protonic acids and organic Lewis bases and are exemplified by the formula: $R_3NH^+BF_4^-$. Common examples of fluorinated Lewis acids include $BF_3$, $PF_5$, $SbF_5$, $SiF_4$, $SnF_4$. Common examples of Lewis bases are the alkyl ethers, sulfides, amines and phosphines.

My reaction is illustrated by the general equation:

$$R'_{y-1}YH + R''_{z-1}ZF + R_3Q + MF_m \rightarrow R'_{y-1}YZR''_{z-1} + [R_3QH]^+ MF_{m+n}^-$$

wherein the symbols are defined as set forth above.

The reactive hydrogen-containing compounds useful in my invention have the formula:

$$R'_{y-1}YH$$

wherein Y can be boron, silicon, tin, nitrogen, phosphorous, arsenic, antimony, bismuth, sulfur; y is an integer equal to the valence of Y; each R′ taken individually can be alkyl, e.g. methyl, ethyl, propyl, isobutyl, sec-hexyl, and dodecyl; alkenyl, e.g. vinyl, propenyl, butenyl, hexenyl, etc.; cycloalkyl, e.g. cyclopropyl, cyclohexyl, and cycloheptyl; aryl having from 6–12 carbon atoms, e.g. phenyl, naphthyl, and biphenyl; phenyl lower alkyl, e.g. benzyl, phenylethyl, and phenylpentyl; phenylamino. diakylaminophenyl, e.g. dimethylaminophenyl, diisopropylaminophenyl; carbalkoxyphenyl, e.g. ethymethoxyphenyl; phenylazophenyl; and hydrogen; and when y is equal to at least 3, R′ and a second R′ taken collectively with Y can form a heterocyclic ring system containing up to 18 carbon atoms and not more than two rings, each having 4–6 annular carbon atoms, e.g. tetrahydropyridine, perhydroquinoline, piperazine, and 3-phenylmorpholine, etc.

The fluorine-containing compounds useful in my invention have the formula:

$$R''_{z-1}ZF$$

wherein Z can be boron, silicon, titanium, tin, zirconium, phosphorus, arsenic, antimony, and sulfur; z is an integer equal to the valence of Z; each R″ taken individually can be alkyl, e.g. methyl, ethyl, propyl, isobutyl, sec-hexyl and dodecyl; alkenyl, e.g. vinyl, propenyl, butenyl, hexenyl, etc.; lower dialkylamino, e.g. dimethylamino and diisopropylamino; cycloalkyl, e.g. cyclopropyl, cyclohexyl, and cycloheptyl; phenyl; nitrophenyl; halophenyl; lower alkylphenyl, e.g. tolyl, xylyl, ethylphenyl, and cumenyl; phenylazophenyl; lower alkoxyphenyl, e.g. methoxyphenyl, butoxyphenyl; and fluorine.

The Lewis acids useful in my invention are compounds of the formula:

$$MF_m$$

wherein M can be zinc, boron, silicon, titanium, zirconium, germanium, tin, phosphorus, arsenic, antimony, and molybdenum and m is an integer equal to the valence of M.

The organic Lewis bases useful in my invention are compounds of the formula:

$$R_3Q$$

wherein Q can be nitrogen and phosphorus, each R taken individually can by hydrogen; alkyl, e.g. methyl, ethyl, propyl, isobutyl, sec-hexyl, and dodecyl; alkenyl, e.g. propyl, isobutyl, sec-hexyl, and dodecyl; alkenyl, e.g. vinyl, propenyl, butenyl, hexenyl, etc.; cycloalkyl; phenyl; halophenyl; and lower alkoxyphenyl, e.g. methoxyphenyl and butoxyphenyl; and R and at least one more R, taken collectively with Q form a heterocyclic ring system containing up to 18 carbon atoms and not more than two rings each having 4 to 6 annular carbon atoms.

Many more types of Lewis acids and Lewis bases exist than the compounds described as useful in my invention. Although amides, alkyl ethers, and sulfides are frequently good Lewis bases, they are not suitable for my invention, since their adducts with $MF_m$ are not generally convertible to stable ionic salts of the type $[R(QH)_n^+[MF_{m+n}]^{n-}$ when Q is sulfur or oxygen. It is also apparent that the term Lewis base is a definition of structural type, restricting the nature of the substituents bonded about the Q atom. Whereas triphenylphosphine is an excellent Lewis base, since it readily donates electron pairs to an electron acceptor, e.g. $BF_3$, triphenylamine is not a Lewis base, because for steric and electronic reasons, it is not an electron donor.

The driving force for this reaction is the conversion of a relatively unstable adduct which is nonionic and relatively organic solvent-soluble to a very stable salt of protonic acid which is highly ionized, and non-polar solvent-insoluble. My invention is restricted to the formation of compounds containing Y—Z bonds by dehydrofluorination only, since the major driving force of my reaction, the conversion of unionizable, solvent-soluble Lewis acid-Lewis base adducts to highly ionic, stable, insoluble salts, is atypical of other halides. Thus, $MBr_m \cdot R_3Q$ does not generally add hydrogen and bromine to give $[R_3QH]_n[MBr_{m+n}]$.

There is some latitude in selecting the most suitable Lewis base for any particular dehydrofluorination reaction. Thus, one may empirically determine the Lewis base which gives the highest yield for a particular system. Actually the most suitable Lewis bases are those whose addition products with fluorinated Lewis acids are reasonably unstable at the temperature of the reaction, but whose Bronsted salts are very stable and highly ionic. In the dehydrofluorination of aniline and boron trifluoride, the relative order of effectiveness of Lewis bases $(R_3Q)$ for the given Lewis acid, $BF_3$, is i-$Pr_2EtN > Et_3N > Me_3N$, as indicated in Example IV below.

It can be seen from the foregoing that, for relatively few combinations of Lewis acids and Lewis bases, a tremendous variety of active hydrogen compounds can be reacted with a wide range of fluorine containing compounds yielding both totally new products or known products by a more direct procedure than heretofore available. The following table illustrates the wide application of my invention.

TABLE I $$R''_{r-n}ZF_n \longrightarrow [R_3QH]_n[MF_{m+n}] + R'_{y-n}YZR''_{r-n}$$

| | $MF_m$ | $R_3Q$ | $R'_{y-n}YH_n$ | $R''_{r-n}ZF_n \longrightarrow [R_3QH]_n[MF_{m+n}] + R'_{y-n}YZR''_{r-n}$ |
|---|---|---|---|---|
| 1 | $BF_3$ | $(i\text{-}C_3H_7)_2C_2H_5N$ | $C_6H_5NH_2$ | $BF_3 \longrightarrow [(i\text{-}C_3H_7)_2C_2H_5NH]^+BF_4^- +$ ring structure with N–B–F, B–F, and $C_6H_5$, $H_5C_6$–N substituents |
| 2 | $BF_3$ | $C_6H_5N(CH_3)(CH_2C_6H_5)$ | $[(CH_3)_2N]_2BH$ | $[(CH_3)_2N]_2BF \longrightarrow [C_6H_5NH]^+BF_4^- + [(CH_3)_2N]_2B\text{–}B[N(CH_3)_2]_2$ (with $CH_3$, $CH_2C_6H_5$ groups) |
| 3 | $BF_3$ | $(CH_3)_2NC_6H_5$ | $C_6H_5NH_2$ | $BF_3 \longrightarrow [(CH_3)_2NH]^+BF_4^- + B(NC_6H_5)_3$ (with H, $C_6H_5$) |
| 4 | $BF_3$ | morpholine ($O(C_2H_4)_2N\text{–}C_6H_5$) | $(CH_3)_2NH$ | $BF_3 \longrightarrow$ morpholine·$BF_4^-$ salt $+ (CH_3)_2NBF$, $[(CH_3)_2N]_2BF$ |
| 5 | $BF_3$ | $s\text{-}(C_4H_9)_2NH$ | $p\text{-}H_{17}C_8OOC\text{–}C_6H_4NH_2$ | $BF_3 \longrightarrow [s\text{-}(C_4H_9)_2NH_2]^+BF_4^- + F\text{–}B$ ring with $N\text{–}C_6H_4COOC_8H_{17}$, $H_{17}C_8OOCC_6H_4\text{–}N$ |
| 6 | $BF_3$ | $(CH_3)_2(H_{19}C_9C)NH_2$ | $CH_2{:}CHCH_2NH_2$ | $BF_3 \longrightarrow [H_{19}C_9C\text{–}NH_3]^+BF_4^- + F\text{–}B$ ring with $N\text{–}CH_2CH{:}CH_2$, $H_2C{:}HCH_2C\text{–}N$ (with $CH_3$ groups) |
| 7 | $BF_3$ | $CH_3O\text{–}C_6H_4\text{–}N(CH_3)_2$ | $(C_6H_5)_2PH$ | $BF_3 \longrightarrow [CH_3O\text{–}C_6H_4\text{–}NH]^+BF_4^- + $ ring with P–B–F, $C_6H_5$ substituents |

TABLE I—Continued

| | $MF_m$ | $R_3Q$ | $R'_{y-n}YH_n$ | $R''_{x-n}ZF_n \longrightarrow [R_3QH]_n[MF_{m+n}] + R'_{y-n}YZR''_{x-n}$ |
|---|---|---|---|---|
| 8 | $BF_3$ | $\begin{array}{c}C_2H_4\\N-C_2H_4-N\\C_2H_4\end{array}$ | $HO_3S-\!\!\!\bigcirc\!\!\!-N\!=\!N-\!\!\!\bigcirc\!\!\!-NH_2$ | $BF_3 \longrightarrow \left[\begin{array}{c}C_2H_4\;H\\N-C_2H_4-N^+\\C_2H_4\end{array}\right]\cdot BF_4^- + \left(F-B\!\!\!\bigcirc\!\!\!-N\!=\!N-\!\!\!\bigcirc\!\!\!-SO_3H\right)_{2-1}$ |
| 9 | $BF_3$ | $\begin{array}{c}CH_3\\(C_6H_5-CH)_2N\end{array}$ | $H_2S$ | $C_2H_5BF_2 \longrightarrow [(C_6H_5CH)_3NH]^+BF_4^- + C_2H_5\!-\!B\!\!\!\begin{array}{c}S\\S\end{array}\!\!\!B\!-\!C_2H_5$ (ring with $C_2H_5$) |
| 10 | $BF_3$ | $C_5H_5N$ | $C_6H_5NH_2$ | $PF_5 \longrightarrow [C_6H_5NH]^+BF_4^- + \begin{array}{c}C_6H_5\\N\\P\;F_3\\N\\C_6H_5\end{array}$ |
| 11 | $BF_3$ | $(i\text{-}C_3H_7)_2N\!-\!C_2H_5$ | $C_3H_7SH$ | $(C_2H_5)_2PF\!=\!O \longrightarrow [(i\text{-}C_3H_7)_2N\!-\!H]^+BF_4^- + (C_2H_5)_2CPSC_3H_7\;=\!O$ |
| 12 | $PF_5$ | $\begin{array}{c}C_2H_5\\C_6H_5\!-\!N\!-\!C_2H_5\end{array}$ | $C_6H_{11}NH_2$ | $PF_5 \longrightarrow [C_6H_5\!-\!N\!-\!H]^+PF_6^- + \begin{array}{c}C_6H_{11}\\N\\F_3P\\N\\C_6H_{11}\end{array}$ |
| 13 | $PF_5$ | $(C_2H_5)_3N$ | $NH_3$ | $PF_5 \longrightarrow [(C_2H_5)_3NH]\!+\!PF_6^- + (NPF_2)_{4\text{-}10}$ |
| 14 | $PF_5$ | $(C_6H_5)_3P$ | $(C_4H_9)_2NH$ | $POF_3 \longrightarrow [(C_6H_5)_3PH]^+PF_6^- + (C_6H_5)_2NPOF_2$ |
| 15 | $PF_5$ | $\begin{array}{c}CH_3\\C_2H_5NC_4H_9\end{array}$ | $(CH_3)_2SbH$ | $BF_3 \longrightarrow [C_2H_5NH]^+PF_6^- + \text{(complex Sb-B-F structure)}$ |

TABLE I—Continued

| | $MF_m$ | $R_3Q$ | $R'_{y-n}YH_n$ | $R''_{z-n}ZF_n \longrightarrow [R_3QH]_n[MF_{m+n}] + R'_{y-n}YZR''_{z-n}$ |
|---|---|---|---|---|
| 16 | $SiF_4$ | $CH_3N\begin{smallmatrix}CH_2-C_2H_4\\CH_2-C_2H_4\end{smallmatrix}$ | $(CH_3)_3SiH$ | $FSi(CH_3)_3 \longrightarrow \left[\begin{smallmatrix}C_2H_4\\CH_2\end{smallmatrix}NCH_3\\CH_2-C_2H_4\;H\end{smallmatrix}\right]^+ SiF_6^- + (CH_3)_3Si\text{-}Si(CH_3)_3$ |
| 17 | $SiF_4$ | $(CH_3)_3P$ | $C_6H_5NH_2$ | $SiF_4 \longrightarrow [(CH_3)_3PH]_2^+SiF_6^- + \begin{smallmatrix}C_6H_5\\F\\N-Si-F\\\;\;\;\;\;\;\;\;\;\;\;\;\;\;\;\;\;F-Si-N\\F\;\;\;\;\;\;\;\;H_5C_6\end{smallmatrix}$ |
| 18 | $ZrF_4$ | $Cl\text{-}C_6H_4\text{-}N\begin{smallmatrix}CH_3\\CH_3\end{smallmatrix}$ | $(C_2H_5)_2NH$ | $ZrF_4 \longrightarrow [Cl\text{-}C_6H_4\text{-}NH\begin{smallmatrix}CH_3\\CH_3\end{smallmatrix}]_2^+ZrF_6^- + [(C_2H_5)_2N]_4Zr$ |
| 19 | $SnF_4$ | $C_6H_5N\begin{smallmatrix}CH_3\\C_4H_9\end{smallmatrix}$ | $C_3H_7SH$ | $SnF_4 \longrightarrow [C_6H_5\text{-}NH\begin{smallmatrix}CH_3\\C_4H_9\end{smallmatrix}]_2^+SnF_6^- + (C_3H_7S)_4Sn$ |
| 20 | $SnF_4$ | $(C_4H_9)_3P$ | $(CH_3)_2AsH$ | $\begin{smallmatrix}F-P-F\\N\;N\\F-P-F\\\;\;\;\;F\;N\;F\end{smallmatrix} \longrightarrow [(C_4H_9)_3PH]_2^+SnF_6^- + \begin{smallmatrix}(CH_3)_2As\\\;\;\;\;N\;\;P-As(CH_3)_2\\\;\;\;\;\;\;\;\;\;\;\;\;\;N\;\;As(CH_3)_2\\(CH_3)_2As\end{smallmatrix}$ |
| 21 | $SbF_5$ | $(CH_3)_2NC_6H_{11}$ | $NH_3$ | $SOF_4 \longrightarrow [HNC_6H_{11}]^+SbF_6^- + \left[\begin{smallmatrix}(CH_3)_2\\\;\;\;\;-N=S\\\;\;\;\;\;\;\;\;\;O\;F\end{smallmatrix}\right]_n$ |
| 22 | $SbF_5$ | $C_6H_5N\begin{smallmatrix}CH_3\\C_2H_5\end{smallmatrix}$ | $C_2H_5SH$ | $(CH_3)_2SbF_3 \longrightarrow [CH_3NH]^+SbF_6^- + (CH_3)_2Sb(F_2)SC_2H_5$ |
| 23 | $SbF_5$ | $H_3C\text{-}N\bigcirc O$ | $(CH_3)_3SnH$ | $(C_6H_5)_2BF \longrightarrow \left[H_3C\text{-}N\bigcirc O\;\;H\right]^+ SbF_6^- + (CH_3)_3Sn\text{-}B(C_6H_5)_2$ |
| 24 | $AsF_5$ | $(CH_3)_2NC_6H_5$ | $C_6H_5SH$ | $AsF_5 \longrightarrow [(CH_3)_2NC_6H_5\;H]^+AsF_6^- + (C_6H_5S)_2AsF_3$ |

TABLE I—Continued

| | $MF_m$ | $R_3Q$ | $R'_{y-n}YH_n$ | $R''_{x-n}ZF_n \longrightarrow [R_3QH]_n[MF_{m+n}] + R'_{y-n}YZR''_{x-n}$ |
|---|---|---|---|---|
| 25 | $MoF_4$ | 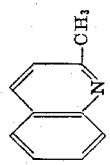 | $(C_4H_9)_2PH$ | $SiF_4 \longrightarrow MoF_6^- + [(C_4H_9)_2P]_2SiF_2$ |
| 26 | $TiF_4$ | $(C_6H_5)_3P$ | $(C_2H_5)_2PH$ | $TiF_4 \longrightarrow [(C_6H_5)_3PH]_2^+TiF_6^{2-} + (C_2H_5)_2PTiF_3$ |
| 27 | $GeF_4$ | $C_6H_5-N(CH_3)_2$ | $(i-C_3H_7)_2PH$ | 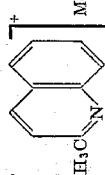 |
| 28 | $ZnF_2$ | $(CH_3)_2NCH_2CH_2C_6H_5$ | $(CH_3)_2NH$ | $(CH_3)_3SiF \longrightarrow [(CH_3)_2NCH_2CH_2C_6H_5]^+ZnF_3^- + (CH_3)_2NSi(CH_3)_3$ |

The reaction is performed under mild reaction conditions. The reaction temperatures are in the range of −20 to 250° C. Normally, the operating temperature is 20 to 100° C. and room temperature is preferred. However, it is undesirable to run the reaction above the upper limit of the temperature range, since the products tend to decompose at elevated temperatures. At temperatures below the minimum, the reaction rate is decelerated to a point at which the reaction ceases.

The reaction is generally run at atmospheric pressure. Sometimes, it is advantageous to use superatmospheric pressure, such as when using nascent Lewis acid-Lewis base adducts, e.g. passing silicon tetrafluoride into a mixture of tertiary- and secondary amines. However, no advantage is obtained by using vacuum, and in fact, the use of vacuum is undesirable because it may result in partial dissociation of adduct.

The reaction is run under substantially anhydrous conditions and preferably in the presence of an inert solvent which acts as a heat transfer fluid and facilitates product separation. Useful solvents include aliphatic hydrocarbons, e.g. hexane, petroleum ether, and mineral oil; haloaliphatic hydrocarbons, e.g. methylene chloride, chloroform, carbon tetrachloride and the fluorocarbon refrigerants; ethers, e.g. ethyl ether, diisopropyl ether, n-butylether and anisole; aromatic hydrocarbons, e.g. benzene, toluene, and xylene; and haloaromatic hydrocarbons, e.g. chlorobenzene, dichlorobenzene, and fluorobenzene. Excellent yields are obtainable by choosing a non-polar liquid, e.g. benzene and toluene, in which the reactants and the condensation products are appreciably soluble, but in which the polar salts of the fluorinated protonic acids are insoluble.

The reaction ratios are relatively unimportant except when competing reactions are possible or when further step-wise dehydrofluorination may occur. Normally, no advantage is obtained in using excess Lewis acid over Lewis base, or vice versa. In some cases it may be desirable to use more Lewis acid-Lewis base adduct than required to remove the amount of hydrogen and fluorine being subject to dehydrofluorination to insure that the reaction goes to completion.

The products of the dehydrofluorination reaction are separated and recovered by typical methods. The condensation product is generally soluble in the solvent medium, whereas the salt of the fluorinated protonic acid is less soluble. Thus, the salt of the fluorinated protonic acid is removed by filtration and separately recovered, while the condensation product is separated from the solvent by evaporation and purified by vacuum sublimation, distillation, or recrystallization.

My invention is further illustrated by the following examples:

Example I

A four-necked flask fitted with a pressure equalized addition funnel, stirrer, thermometer, and condenser was flushed with nitrogen then charged with 100 ml. anhydrous benzene and 56.2 g. (0.396 mole) $BF_3 \cdot Et_2O$. To the stirred mixture was then gradually added a mixture of 33.6 g. (0.26 mole) i-$Pr_2EtN$ and 12.1 g. (0.13 mole) aniline from the addition funnel at a rate such that the temperature did not exceed 45° C. The reaction mixture was stirred for three hours, during which a fine needle-like white crystalline precipitate was formed. Filtration of the precipitate gave 54.0 g., 99 percent yield, of diisopropylethyl ammonium tetrafluoroborate, M.P. 210–214° C. Removal of solvent from the filtrate under reduced pressure gave 16.3 g. (0.045 mole), i.e. a quantitative yield of N-triphenyl-B-trifluoroborazine. The compound sublimed at 170–180° C. at 0.5 mm. Hg to transparent crystals with a slight yellow cast, M.P. 170–180°

C. Elemental analysis of the product, purified by double sublimation, indicated:

| Element | Found | Theory ($\phi_3N_3B_3F_3$) |
|---|---|---|
| Carbon | 59.79 | 59.59 |
| Hydrogen | 4.07 | 4.18 |
| Nitrogen | 11.60 | 11.58 |
| Fluorine | 15.70 | 15.71 |
| Boron | 8.81 | 8.98 |

*Example II*

Using the apparatus of Example I, with the exception that a solids addition funnel was substituted for the pressure equalized addition column, 4.7 g. (0.0292 mole) $C_6H_5NH_2 \cdot BF_3$ was added to a solution of 11.5 g. (0.0585 mole) i-$Pr_2EtN \cdot BF_3$ in 100 ml. benzene. A slow reaction occurred, the granular crystals of $C_6H_5NH_2 \cdot BF_3$ were replaced with fine crystals. Filtration of the insoluble crystals gave 11.7 g. (0.059 mole) [i-$Pr_2EtNH$]$^+BF_4^-$ while removal of the solvent from the filtrate at reduced pressure gave 3.1 g. (0.009 mole) of the desired N-triphenyl-B-trifluoroborazine $(C_6H_5NBF)_3$.

*Example III*

A. In the apparatus described in Example I, a mixture of 26.2 g. (0.26 mole) triethylamine and 12.2 g. (0.13 mole) aniline were added to a stirred solution of 56.2 g. (0.396 mole) boron trifluoride etherate in 200 ml. ethyl ether. A liquid separated during the reaction that gradually solidified. Infrared analysis indicated that precipitate to be a mixture of [$Et_3NH$]$^+BF_4^-$ and $C_6H_5NH_2 \cdot BF_3$. The solid obtained on evaporation of the filtrate was $Et_3N \cdot BF_3$ containing some $C_6H_5NH_2 \cdot BF_3$ and a small quantity of the desired N-triphenyl-B-trifluoroborazine.

B. To determine if higher temperatures would give better yields, the solids from above were combined and kept at 165° C. for five hours. The benzene-insoluble portion of the product was shown by IR to be [$Et_3NH$]$^+BF_4^-$, while the benzene-soluble portion gave 15.5 g. (.0427 mole) solids shown by IR to be crude N-triphenyl-B-trifluoroborazine. Thus, a quantitative yield of crude product was obtained by using triethylamineboron trifluoride for dehydrofluorination at temperatures above those previously used.

*Example IV*

Aniline 7.4 g. (.0795 mole) was added slowly to a stirred solution of 11.2 g. (.0792 mole) $BF_3 \cdot Et_2O$ in 80 ml. chlorobenzene. Then 10.1 g. (.0795 mole) trimethylamine-boron trifluoride was added, and the mixture was refluxed for six hours. IR examination of the reaction mixture after removal of solvent indicated that no borazine had been formed. The solid mixture was heated 1½ hours at 210° C. with some sublimation occuring. The sublimate was shown to contain a small yield of N-triphenyl-B-trifluoroborazine.

Examples I, II, III, and IV indicate that the relative order of effectiveness is i-$Pr_2EtN > Et_3N > Me_3N$ when used with boron trifluoride for the dehydrofluorination of the aniline-boron trifluoride adduct.

*Example V*

In the apparatus described in Example I, a mixture of 12.1 g. (0.13 mole) aniline and 38.8 g. (0.26 mole) N,N'-diethylaniline was added to a stirred mixture of 56.2 g. (0.396 mole) boron trifluoride etherate in 250 ml. benzene. The mixture was refluxed for eight hours and, when cooled, formed long needle crystals of diethylaniline fluoroborate [$C_6H_5(Et)_2NH$]$^+BF_4^-$. Recovery of the solids from the filtrate gave a quantitative yield of the desired N-triphenyl-B-trifluoroborazine.

*Example VI*

In the apparatus described in Example I, a stirred solution of 56.2 g. (0.396 mole) boron trifluoride-ethyl ether adduct in 250 ml. of benzene was treated with a mixture of 12.1 g. (0.13 mole) aniline, and 37.2 g. (0.26 mole) quinaldine. After one hour, solid gradually precipitated from the stirred solution. After two additional hours of stirring, filtration and removal of solvent from the precipitate gave a theoretical yield of quinaldinium tetrafluoroborate. Removal of solvent from the filtrate gave a quantitative yield of crude N-triphenyl-B-trifluoroborazine.

*Example VII*

In the apparatus described in Example I, a stirred solution of 28.1 g. (0.198 mole) boron trifluoride-ethyl ether in 250 ml. benzene was treated with a mixture of 6.05 g. (0.065 mole) aniline and 16.8 g. (0.13 mole) di-sec.-butyl amine. Filtration, after about three hours of stirring at room temperature, gave 19.0 g. (.088 mole) of colorless plates, melting at 142–144° C., and identified by infrared spectroscopy as di-sec.-butylamine fluoroborate,

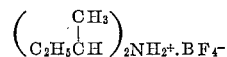

from a double N—H stretching band, $NH_2^+$ deformation band, and the very intense $BF_4^-$ band at 8.5–10.0 microns. Removal of solvent from the filtrate gave 16.2 g. of solids shown by infrared bands to be a mixture of N-triphenyl-B - trifluoroborazine and di-sec.-butylammonium tetrafluoroborate.

*Example VIII*

The boron trifluoride-t-butylamine adduct was prepared by reacting 28.0 g. (0.383 mole) t-butylamine with 56.2 g. (0.392 mole) boron trifluoride etherate in 250 ml. benzene, at from 0–10° C. The product was collected in 85% yield as a white solid that was stable in air.

Then, 7.05 g. (0.076 mole) aniline was added to a stirred mixture of 250 ml. benzene, 22.6 g. (0.16 mole) t-butylamine boron trifluoride, and 0.078 mole boron trifluoride etherate. The mixture was refluxed for 1½ hours, forming a clear solution. Cooling to room temperature gave 25.8 g. of a powdery white solid, shown by IR by comparison with previous samples to be a mixture of aniline boron trifluoride and t-butylamine boron trifluoride. Removal of solvent from the filtrate at reduced pressure gave 3.9 g. of white solids indicated by IR by comparison to previous samples to be a mixture of t-butylamine boron trifluoride and N-triphenyl-B-trifluoroborazine. The sample was stirred with 30 ml. benzene, then filtered. Removal of solvent at reduced pressure gave 1.25 g., 13.6% yield, of N-triphenyl-B-trifluoroborazine.

Examples V through VIII show the wide range of Lewis bases which may be used, when combined with boron trifluoride, for dehydrofluorination. They include primary, secondary, and tertiary amines, and aliphatic, aromatic, and heterocyclic amines.

The following examples are shown to illustrate the versatility of the RQH function in the reaction.

*Example IX*

A mixture of 50 ml. (0.396 mole) $BF_3 \cdot Et_2O$, 33.5 g. (0.26 mole) i-$Pr_2EtN$, 9.49 g. (0.13 mole) t-$BuNH_2$ were stirred for four hours at room temperature. Crystals that were filtered off were [i-$Pr_2EtNH$]$^+BF_4^-$. The solvent layer was air-sensitive and contained both unreacted i-$Pr_2EtNBF_3$ and $(FBNCMe_3)_3$. This was very difficult to separate from the unreacted i-$Pr_2EtNBF_3$. The $(FBNCMe_3)_3$ was a white solid, M.P. 148–149.5° C., subliming at 70° C. at 0.5 mm., 110–120° C. at atmospheric pressure.

Example X

Ethylamine-boron trifluoride was prepared from ethylamine and boron trifluoride, then added (21.4 g., 0.19 mole) to a solution of diisopropylethylamine boron trifluoride prepared by treating 28.1 g. (0.198 mole) $BF_3 \cdot Et_2O$ in 250 ml. benzene with 24.5 g. (0.19 mole) diisopropylethylamine. After one hour, two layers formed. The reaction was completed by adding an additional 25 ml. $BF_3 \cdot Et_2O$ followed by 24.5 g. diisopropylethylamine to the solution. The precipitate which formed was diisopropylethylammonium tetrafluoroborate, 28.5 g. (0.362 mole), 95 percent.

Removal of solvent from the filtrate at reduced pressure gave two immiscible layers. The top layer distilled at 0.5 mm. and room temperature to give a colorless liquid identified by infrared spectroscopy from absence of N—H stretching bonds, and a strong bond at 6.8 and 13.8μ characteristic of borazine as N - triethyl - B - trifluoroborazine; total yield was 9.0 g., or 65 percent of theoretical. Redistillation gave a sample 99+ percent pure by vapor phase chromatography, having a boiling point of 74° C. at 25 mm., and 91–92° C. at 51 mm. Its density was $d_4^{25°}=1.0596$ and refractive index $n_D^{24°}=1.3993$. Combustion analysis showed:

Found: C, 33.09%; H, 6.92%; N, 19.23%; B, 14.71%; F, 25.91%. Theoretical: C, 32.96%; H, 6.92%; N, 19.22%; B, 14.84%; F, 26.01%.

Example XI

Methylamine (4.55 g., 0.147 mole) was distilled into a stirred mixture of 64.5 g. (0.451 mole) boron trifluoride ethyl etherate in benzene kept at 3° C. Then the stirred mixture was treated with 37.9 g. (0.293 mole) diisopropylethylamine. The precipitate that formed during the reaction was filtered, washed with ethyl ether, and dried to give 59.0 g. (0.272 mole) solids which were shown by IR to be $[i-Pr_2EtNH]^+BF_4^-$. From the filtrate was recovered 3.0 g. of air-sensitive solid, which was purified by sublimation at reduced pressure. Its IR spectra indicated that it was the desired N-trimethyl-B-trifluoroborazine by comparison with literature references.

Example XII

An anhydrous mixture of 9.0 g. (0.457 mole)

in 100 g. benzene was treated with 6.0 g. (0.0226 mole) p-phenylazoaniline-boron trifluoride adduct. The mixture was stirred six hours and filtered. The insoluble crystals were $[i-Pr_2EtNH]^+BF_4^-$; removal of solvent from the filtrate gave 4.15 g. (0.00615 mole) of reddish solid whose IR spectra indicated borazine

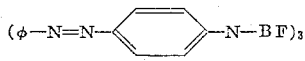

The intense and deepened color, compared to the yellow of phenylazoaniline, shows a marked transmission of conjugative resonance through the borazine ring.

The increased stability of this borazine, as contrasted with chloroborazine makes it valuable as fiber reactive dyes. For example, if the above borazine and diisopropylethylamine boron trifluoride in a non-hydroxylic solvent is added to a cellulose fiber, good dye absorption is obtained by the reaction:

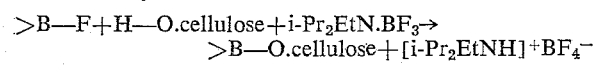

Example XIII

Boron trifluoride-p-ethyl aminobenzoate complex was formed by the addition of 31.4 g. (0.19 mole) p-ethyl aminobenzoate to 25.1 g. (0.198 mole) boron trifluoride etherate in 250 ml. benzene, stirring the mixture for three hours, then filtering the white powdery precipitate. The dried adduct weighed 41.0 g. (92 percent), and melted at 170–173° C. with decomposition and gassing. Its infrared spectra indicated a complex of the amino group, rather than the carbonyl portion of the molecule, from changed amino stretching and deformation frequencies, and an unchanged carbonyl stretching frequency. To 9.1 g. (0.039 mole) of this complex in 100 ml. of benzene was added 11.25 g. (.0792 mole) boron trifluoride etherate followed by 10 g. (0.077 mole) diisopropylethylamine. A reaction quickly occurred with the solution becoming quite viscous. Filtering and drying the solids gave 12.85 g. (0.059 mole) diisoproplyethylammonium tetrafluoroborate. Removal of solvent from the filtrate at reduced pressure gave 12.15 g. of a viscous slurry which turned to a semi-solid. The infrared spectra of the semi-solid indicated it to be a mixture of diisopropylethyl boron trifluoride, a small amount of diisopropylethylammonium tetrafluoroborate and the desired N-(tris-p-carbethoxyphenyl)-B-trifluoroborazine, by disappearance of the N—H stretching frequency, and a series of three vibrations at 6.7, 6.9 and 7.0 microns, which may be characteristic of N-phenylborazines. The purified borazine is useful for fixing polyester resins and polyepoxy resins to glass fibers.

Example XIV.—Reaction of phenyl hydrazine boron trifluoride with diisopropylethylamine boron trifluoride The object of this experiment was the preparation of the unknown N-amino-substituted borazines. A solution of diisopropylethylamine boron trifluoride in 250 ml. benzene prepared by the reaction of 28.1 g. (0.198 mole) boron trifluoride etherate with 24.5 g. (0.19 mole) diisopropylethylamine was treated with 17.6 g. (0.10 mole) solid phenylhydrazine boron trifluoride adduct prepared from equimolar quantities of phenylhydrazine and boron trifluoride. The color darkened considerably and the mixture thickened. After being stirred at room temperature for two hours, the mixture was filtered, and the solvent removed from both the precipitate and filtrate at reduced pressure. The solids from the precipitate gave 40.6 g. solids (99 percent yield) which were shown by infrared to be primarily diisopropylethylammonium tetrafluoroborate. Removal of solvent from filtrate at reduced pressures gave 12.5 g. crude N-trianilino-B-trifluoroborazine.

Example XV

A mixture of 8.5 g. (.0525 mole) $C_6H_5NH_2.BF_3$ in 100 ml. benzene was mixed at room temperature with 12.3 g. (0.105 mole) $i-Pr_2EtN$ then refluxed one hour and cooled. From the reaction was filtered 4.8 g. (0.22 mole) $[i-Pr_2EtNH]^+BF_4^-$. The solvent layer gave 3.15 g. (0.022 mole, 84 percent) trisanilinoborane, identified by infrared melting point and analysis. The preparation of the borane rather than borazine is attributable to the presence of excess aniline, provided according to the equations:

$C_6H_5NH_2.BF_3 + i-Pr_2EtN \longrightarrow i-Pr_2EtNBF_3 + C_6H_5NH_2$ $C_6H_5NH_2.BF_3 + 2C_6H_5NH_2 + 3i-Pr_2EtN.BF_3 \longrightarrow$

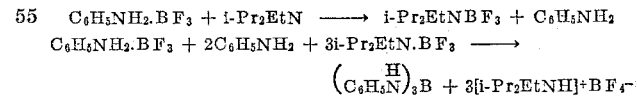

The results of the above experiment were checked in the following experiment. A mixture of 29.5 g. (.228 mole) $i-Pr_2EtN$ and 6.2 g. (0.0386 mole) $C_6H_5NH_2.BF_3$ was warmed to 60° C. for one hour then cooled. Filtration gave 6.0 g. (0.0279 mole) $[i-Pr_2EtNH]^+BF_4^-$ and 1.5 g. (0.0052 mole) $(C_6H_5NH)_3B$.

Example XVI

A. An 8.0 g. sample of $BF_3.C_6H_5NH_2$ was refluxed in chlorobenzene. The charge was recovered unchanged.

B. A 6.7 g sample of $C_6H_5NH_2.BF_3$ was heated at 160° C. under reduced pressure. Sublimation occurred, but there was an absence of dehydrofluorination and formation of borazine.

C. A 3.6 g. sample of $Me_3CNH_2BF_3$ was heated at 150° C. and under reduced pressure. The complex sublimed, but remained unchanged.

D. A 13.0 g. sample of

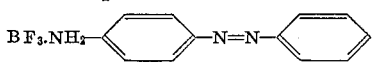

was refluxed in chlorobenzene. The charge was recovered essentially unchanged.

E. A 3.5 g. sample of

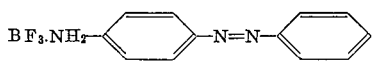

was heated under reduced pressure. Some sublimation occurred, but no borazine was formed.

The above experiments show that one of the standard methods for the formation of B-haloborazines from primary amine and boron trichloride or boron tribromide is not effective for boron trifluoride adducts of primary amines.

This Example XVI when considered with Example XV, which shows that tertiary amines alone and primary amine adducts of boron trifluoride do not give B-fluoroborazines (another method for preparing B-chloro- or bromoborazines), illustrates that in accordance with our invention it became possible to readily prepare compounds which have heretofore been unavailable.

*Example XVII*

Phosphorus pentafluoride, formed by decomposition of 100 g. (0.401 mole) benzenediazonium hexafluorophosphate, was added slowly to a rapidly stirred solution of 33.6 g. (0.36 mole) aniline in 250 ml. benzene. Air sensitivity of the reaction flask contents, perhaps due to excess $PF_5$, was removed by placing the flask under reduced pressure a few minutes. The precipitate was filtered and washed with benzene and dried at reduced pressure to give 64.7 g. (0.296 mole, 82 percent yield, based on aniline) of white powdery solid, aniline-phosphorus pentafluoride. Removal of solvent from the filtrate gave a solid viscous mixture containing $C_6H_5NH_2 \cdot PF_5$, free aniline, and $C_6H_5NH_3^+PF_6^-$.

Heating $C_6H_5NH_2 \cdot PF_5$ under $N_2$ gave softening of the material at 225° C. and distillation of liquid at 265° C. with some decomposition occurring, as evidence by HF fumes in the exit trap. The infrared spectra indicated no $(C_6H_5PF_3)_n$ composition. Apparently no reaction of the type $$C_6H_5NH_2PF_5 \rightarrow (C_6H_5NPF_3)_n + C_6H_5NH_3^+PF_6^-$$

occurred.

Similarly no structure of $(C_6H_5NPF_3)_n$ was detected when $C_6H_5NH_2 \cdot PF_5$ was heated at reduced pressure.

*Example XVIII*

Phosphorus pentafluoride, prepared by decomposing 73 g. (0.293 mole) diazonium hexafluorophosphate, was added to a stirred mixture of 8.4 g. (0.09 mole) aniline and 18.2 g. (0.181 mole) triethylamine in 250 ml. benzene cooled to 5° C. After warming to room temperature, the reaction mixture was not air sensitive. Filtration and removal of solvent from the precipitate under reduced pressure gave 40.2 g. (90 percent yield) of triethylammonium hexafluorophosphate while removal of solvent from filtrate gave 14.4 g. (90 percent yield) of white solids whose infrared spectra indicated no $C_6H_5NH_2PF_5$ or $Et_3NHPF_6$. The infrared spectra gave only weak N—H absorptions. It is postulated that the phosphorus nitrogen compound is represented by the structure:

wherein $n$ is an integer having a value of from 2–20.

Sublimation of the product at reduced pressure up to a temperature of 150° C. gave two fractions. A white sublimate formed between 110–140° C., and contained no N—H infrared absorption, and a "clean" appearing spectra. Its analysis was:

Found: C, 40.0%; H, 2.89%; N, 7.73%; P, 17.46%; F, 31.66%. Theory $(C_6H_5NPF_3)_n$: C, 40.4%; H, 2.83%; N, 7.86%; P, 16.88%; F, 31.99%.

The melting point was broad, from 194–204° C. with some bubbling occurring. Ebulliscopic molecular weight in benzene was 303 while theory for a dimer gives 356. Nuclear magnetic resonance showed fluorine in two environments, in about a 2:1 ratio as would be expected for a structure containing either two apical or two equatorial fluoride atoms. An analogous compound $(MeN-PCl_3)_2$ has been reported to be dimer. Since our molecular weight data also confirms a dimeric structure, it is reasonable to assume that the product has a dimetric structure containing two equatorial and one apical fluorines with one apical and one equatorially bonded nitrogen atom bonded on each phosphorus.

The reaction product, non-volatile at 140° C., has a weak N—H singlet in its infrared spectra and a molecular weight of 446. When this solid is heated to 170–200° C. at reduced pressure, a small portion sublimes unchanged (identical infrared spectra) with the remainder changing to a brite resin with a molecular weight of 700 indicating polymerization. This product conforms with the structure:

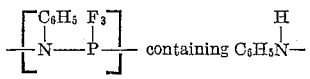

or $PF_4$-end groups.

*Example XIX*

It was desired to determine if a tertiary amine by itself could cause dehydrofluorination. It was thought the diisopropylethylamine would give a clear-cut case, since it should be too sterically hindered to form any adduct with $PF_5$ and thus decompose $C_6H_5NH_2 \cdot PF_5$ to give a reaction of the type

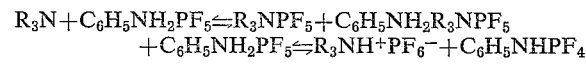

etc.

Thus, 17.8 g. (0.138 mole) diisopropylamine and 14.2 g. (0.065 mole) aniline phosphorus pentafluoride was added to 250 ml. tetrachloroethylene. The temperature rose about 1° with the solids becoming gummy. After being stirred at 115° C. for two hours, the cooled reaction mixture, which still smelled of amine, was filtered and the solvent removed from the filtrate at reduced pressure to give 14.5 g. of a sticky solid shown by infrared to be primarily diisopropylethylammonium hexafluorophosphate containing aromatic impurity. Purification gave 11.1 g. (0.045 mole) diisopropylethylammonium hexafluorophosphate. Removal of solvent from the reaction filtrate, dissolving this solid in benzene, filtering and removal of solvent from the filtrate gave 3.3 g. (0.017 mole) of the structure

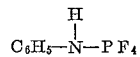

This structure is confirmed by IR which indicated a singlet N—H absorption and a band at 7.1 in the region at which a P—N shows absorption. Heating the product to 150° C. at reduced pressure gave distillation of a small quantity of oil that solidified, but lead to polymerization of most of the product.

Isolation of diisopropylethylammonium hexafluorophosphate indicated that the reaction did proceed by the equation above and is further evidence that amines by themselves are incapable of dehydrofluorination of phosphorus pentafluoride adducts.

*Example XX*

To a solution of 28.1 g. (0.196 mole) $BF_3 \cdot Et_2O$ in 250 ml. benzene was added 25.8 g. (0.199 mole) diisopropylethylamine to form i-Pr₂EtNBF₃. This mixture was then treated with 20 g. (0.0917 mole) aniline phosphorus pentafluoride causing a temperature rise of 10°. After being stirred two hours, the mixture was filtered, giving 43.4 gms. insoluble solids, mostly [i-Pr₂EtNH]⁺BF₄⁻ by infrared and 11.9 g. sticky solids recoverable from the filtrate. These solids, triturated with a small quantity of benzene, gave an insoluble solid identical to the product previously isolated (Example XVIII), a soluble solid of comparable composition, and an unidentified oil.

*Example XXI.—Reaction of triethylamine phosphorus pentafluoride with ammonia phosphorus pentafluoride*

The purpose of this experiment was to determine whether the dehydrofluorination procedure could be applied to the direct preparation of phosphonitrilic fluorides which has not been effected by other methods. A solution of 21.4 g. (0.21 mole) triethylamine in 250 ml. benzene at 6° C. was treated with phosphorus pentafluoride until absorption was completed, then 10 g. (0.0704 mole) ammonia: phosphorus pentafluoride was added, according to the reaction:

nNH₃PF₅+3nEt₃N.PF₅→3nEt₃NH⁺PF₆⁻+(PNF₂)ₙ

The stirred mixture was held at 6° C. for one hour then allowed to warm to room temperature; a portion of the solvent and lower boiling products were then removed at reduced pressure. The low-boiling portions below 60° C. were distilled. An examination of the fractions by infrared analysis and vapor phase chromatography indicated phosphonitrilic fluoride trimer, tetramer, and pentamer were present. The remaining reaction solids were filtered, washed with benzene, and dried to give 55.8 g. product, mainly Et₃NH⁺PF₆⁻. Extraction of these solids with petroleum ether gave 1.0 gm. of a semi-solid indicated by infrared analysis to be the higher phosphonitrilic fluorides. Extraction of another portion of the solids with benzene left 3.2 g. solids in the Soxhlet. These solids were shown by infrared to be a mixture of Et₃NHPF₆ and NH₃.PF₅, indicating an incomplete reaction and suggesting that an excess of dehydrofluorinating agent should be used.

*Example XXII*

A 500 ml. flask containing 250 ml. benzene was evacuated to the boiling pressure of benzene, and then gaseous silicon tetrafluoride added, followed by gaseous trimethylamine. This alternate addition was repeated until an appreciable amount of white solids had been formed in the flask. The flask was again evacuated, then 10.2 g. (0.109 mole) aniline was added followed by addition of silicon tetrafluoride until absorption ceased. Since the flasks contents fumed strongly, it was placed under reduced pressure for two hours to decompose any unstable portion of the mixture. The mixture, still air-sensitive, was filtered under N₂ and washed with petroleum ether several times. The white, insoluble reaction product weighing 27.4 g. was extremely sensitive to moisture, fuming even in the dry box.

The IR analysis of the solids on mulls prepared in the dry box had a strong N—H band at 3.2μ but only a weak band at 13.8μ (indicative of the SiF₆⁼ ion). When this solid was exposed to the air until fuming ceased, the same strong N—H band at 3.2μ was present but now the very strong 13.8μ absorption indicative of SiF₆⁼ was present. Bands indicative of hydrated silica, also present, were absent after vacuum sublimation of the exposed product at 120–130° C. Sublimation of the original solids at 80° C. at reduced pressure gave a small quantity of solids, very sensitive to hydrolysis even in the dry box. This sample had a much stronger alkyl band, as compared to the N—H band, than previous samples, indicating presence of Me₃NSiF₄. Further sublimation gave white solids, with a strong SiF₆⁼ band, melting at 425–30° C. in a sealed capillary. Analysis of this sublimate gave C, 25.0%; H, 6.95%; N, 9.24%; F, 46.34%; Si, 12.47% by diff.

The analysis indicates that the sublimate is composed of a mixture of Me₃NHSiF₅, and (Me₃MH)₂SiF₆.

Evaporation of the filtrate from the original reaction gave 15.2 g. of yellowish air-sensitive solids which was dissolved in benzene and filtered to give a gummy solid no longer air sensitive. The solids, when heated at reduced pressure, gave an oil at 100° C., and yellow solids (by sublimation at 170–180° C.) which by infrared were virtually free of N—H bonding. The sublimation residue was brittle and somewhat air sensitive, which on analysis gave C, 49.09%; H, 4.12%; N, 8.23%; F, 22.2%; Si, 16.32%. This gives a mole ratio of C₇H₇NSi.₉₂F₁.₉₉. This compound may be described structurally as

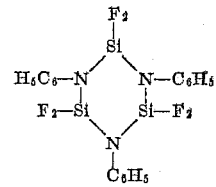

*Example XXIII.—Reaction of aniline-silicon tetrafluoride with diisopropylethylamine*

This experiment was designed to see if the reactions outlined below could be effected:

C₆H₅NH₂SiF₄+i-Pr₂EtN→C₆H₅NHSiF₃+i-Pr₂EtNHF
C₆H₅NH₂SiF₄+2i-Pr₂EtN→C₆H₅NSiF₃+i-Pr₂EtNHF

The mixture of 11.1 g. (.056 mole) aniline-silicon tetrafluoride, 14.8 g. (.114 mole) diisopropylethylamine and 100 ml. benzene were stirred two hours at room temperature, then refluxed two hours. Filtering and drying the insoluble solids gave 7.2 g. white solids while the filtrate gave 5.0 g. of a liquid solid mixture. The insoluble solids were mainly unreacted aniline-silicon tetrafluoride plus a small amount of i-Pr₂EtNH⁺.

The soluble layer was about half aniline plus some unreacted aniline-silicon tetrafluoride plus another component, such as C₆H₅NHSiF₃.

Again, this shows that amines alone are not effective for dehydrofluorination, but a complex of the amine and metalloid fluoride is necessary.

*Example XXIV*

To a chilled suspension of 1.9 g. 4-nitrobenzenesulfonyl-fluoride and 2.1 g. tributylphosphine in 150 ml. anhydrous hexane, stirred in an inert atmosphere, was added simultaneously 0.9 g. aniline in 10 ml. hexane and dry BF₃ gas, in separate parts. The exothermic reaction deposited a solid very rapidly. The mixture was stirred overnight, then cautiously filtered. The solids were extracted with 1% NaOH solution; acidification of this extract with hydrochloric acid gave almost 1 g. of 4-nitrobenzenesulfo-anilide, identified by M.P. (134–5° C., compared to 136° C. given in the literature).

*Example XXV*

A stirred mixture of 40 g. (0.463 mole) o-phenylene-diamine and 144 g. (1.39 moles) triethylamine in 400 ml. dried benzene was reacted with silicon tetrafluoride until absorption was complete. An insoluble viscous material was formed according to the equation:

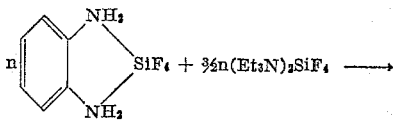

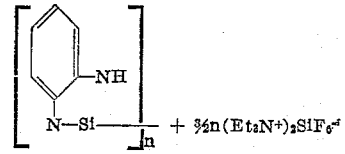

wherein n is an integer having a value of 10–5000. When treated with cold water, triethylammonium hexafluorosilicate dissolved and left a viscous polymer that cured at 250° C. to a moldable solid.

*Example XXVI*

A mixture of 24.6 g. (0.436 mole) tetraaminobiphenyl and 28.0 g. (0.114 mole) trimethylamine in 150 ml. benzene was reacted at room temperature with silicon tetrafluoride until absorption was complete. After filtering and removing the solvent, the solids were treated with water to remove the trimethylammonium hexafluorosilicate salt. The water-insoluble product was 16.6 g. of a dark colored moldable silazane polymer of the structure

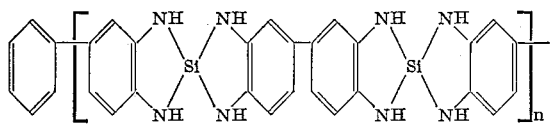

wherein n is an integer having a value of 2–1000.

*Example XXVII*

A stirred mixture of 40 g. (0.47 mole) o-phenylenediamine and 112 g. (1.11 mole) triethylamine in 250 ml. monochlorobenzene was reacted with 186 g. (1.48 mole) phosphorus pentafluoride. Filtering the reaction mixture gave a mixture of triethylammonium hexafluorophosphate and a polymer of the structure

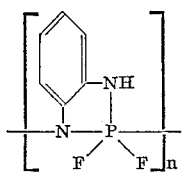

wherein n is an integer having a value of 10–5000.

When separated from the salt, the polymer was a hard tacky material which became a viscous mass at about 45° C.

I claim:

1. A method of simultaneously making salts of fluorinated protonic acids and condensation products characterized by at least one Y—Z bond, wherein Y is a member selected from the group consisting of boron, silicon, tin, nitrogen, phosphorus, arsenic, antimony, bismuth, and sulfur and Z is a member selected from the group consisting of boron, silicon, titanium, zirconium, tin, phosphorus, arsenic, antimony, and sulfur, comprising reacting under substantially anhydrous conditions and at a temperature of −20 to 250° C.

(a) a Lewis acid of the formula:

$$MF_m$$

wherein M is a member selected from the group consisting of zinc, boron, silicon, titanium, zirconium, germanium, tin, phosphorus, arsenic, antimony, and molybdenum; and m is an integer equal to the valence of M, and (b) an organic Lewis base of the formula:

$$R_3Q$$

wherein Q is a member selected from the group consisting of nitrogen and phosphorus; each R taken individually is independently selected from the group consisting of hydrogen, alkyl having 1–18 carbon atoms, alkenyl having 2–18 carbon atoms, cycloalkyl having 3–7 annular carbon atoms, phenyl, halophenyl, and lower alkoxyphenyl; and R and at least one more R, taken collectively with Q, form a heterocyclic ring system containing up to 18 carbon atoms with not more than two rings each having 4 to 6 annular carbon atoms with (c) a reactive hydrogen containing compound of the formula:

$$R'_{y-1}YH$$

wherein Y is defined as above; y is an integer equal to the valence of Y; each R' taken individually is independently selected from the group consisting of alkyl having 1–18 carbon atoms, alkenyl having 2–18 carbon atoms, cycloalkyl having 3–7 annular carbon atoms, aryl having 6–12 carbon atoms, phenyl lower alkyl, phenylamino, dialkylaminophenyl, carbalkoxyphenyl, phenylazophenyl, and hydrogen; and when y is equal to at least 3, R' and at least a second R' taken collectively with Y form a heterocyclic ring system containing up to 18 carbon atoms and not more than two rings each having 4 to 6 annular carbon atoms, and (d) a fluorine-containing compound of the formula:

$$R''_{z-1}ZF$$

wherein Z is as defined above; and z is an integer equal to the valance of Z; each R'' taken individually is independently selected from the group consisting of alkyl having 1–18 carbon atoms, alkenyl having 2–18 carbon atoms, cycloalkyl having 3–7 annular carbon atoms, phenyl, nitrophenyl, halophenyl, lower alkylphenyl, phenylazophenyl, lower alkoxyphenyl, and fluorine; and when z is equal to at least 3, R'' and a second R'' taken collectively with Z form a heterocyclic ring containing 3 to 5 annular carbon atoms; and recovering said salts and said condensation products.

2. A method according to claim 1 wherein said inert solvent is a non-polar liquid in which said Lewis acid, said organic Lewis base, said reactive hydrogen-containing compound, said fluorine-containing compound, and said condensation product are appreciably soluble and in which said salts of fluorinated protonic acids are insoluble.

3. The method of claim 1 wherein said salt of fluorinated protonic acid is selected from the group consisting of a triorgano-ammonium fluoroborate, a triorgano-ammonium hexafluorophosphate and a triorgano-ammonium hexafluorosilicate; said condensation product is selected from the group consisting of a B-fluoroborazine, and P-fluorophosphazane and a Si-fluorosilizane; said temperature is a temperature of 20–100° C., said Lewis acid is selected from the group consisting of boron trifluoride, phosphorus pentafluoride and silicon tetrafluoride; said organic Lewis base is a tertiary amine, said reactive hydrogen-containing compound is a primary amine and said fluorine-containing compound is selected from the group consisting of boron trifluoride, phosphorus pentafluoride and silicon tetrafluoride.

4. The mehod of claim 1 wherein said inert solvent is benzene, said salt of fluorinated protonic acid is diisopropylammonium tetrafluoroborate, said condensation product is N-triphenyl-B-trifluoroborazine, said Lewis acid is boron trifluoride, said organic Lewis base is diisopropylethylamine, said reactive hydrogen-containing compound is aniline and said fluorine-containing compound is boron trifluoride.

5. The method of claim 1 wherein said condensation product is the compound of the formula:

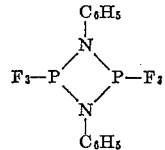

said temperature is a temperature of 5–100° C., said Lewis acid is phosphorus pentafluoride, said organic Lewis base is triethylamine, said reactive hydrogen-containing compound is aniline and said fluorine-containing compound is phosphorus pentafluoride.

6. The method of claim 1 wherein said condensation product is the compound of the formula:

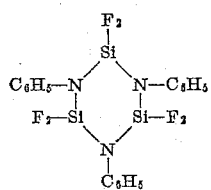

said Lewis acid is silicon tetrafluoride, said organic Lewis base is trimethylamine said reactive hydrogen-containing compound is aniline and said fluorine-containing compound is silicon tetrafluoride.

7. The method of claim 1 wherein said condensation product is a polymer of the formula:

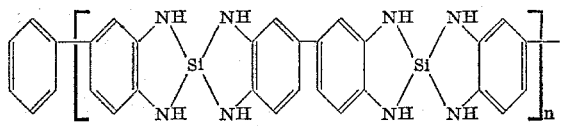

wherein $n$ is an integer having a value of 2–1000, said inert solvent is benzene, said temperature is room temperature, said Lewis acid is silicon tetrafluoride, said organic Lewis base is trimethylamine, said reactive hydrogen-containing compound is tetraminobiphenyl, and said fluorine-containing compound is silicon tetrafluoride.

References Cited by the Examiner

UNITED STATES PATENTS

| | | | |
|---|---|---|---|
| 2,667,403 | 1/1954 | Sowa | 23—14 |
| 2,834,717 | 5/1958 | Shiah | 260—606.5 |

OSCAR R. VERTIZ, *Primary Examiner.*

H. S. MILLER, *Assistant Examiner.*